United States Patent [19]

Bumpus

[11] Patent Number: 5,050,652
[45] Date of Patent: Sep. 24, 1991

[54] DOWELL ROD CUTTING APPARATUS

[76] Inventor: Hershel Bumpus, R.R. #2, Dixon, Ky. 42409

[21] Appl. No.: 574,887

[22] Filed: Aug. 30, 1990

[51] Int. Cl.$^5$ .............................................. B25H 1/00
[52] U.S. Cl. ................................ 144/286 R; 144/285; 269/16; 269/296
[58] Field of Search ............. 144/285, 286 R; 269/16, 269/307, 287, 296; 409/220; 415/115

[56] References Cited

U.S. PATENT DOCUMENTS

| | | | |
|---|---|---|---|
| 3,851,756 | 12/1974 | Brown | 269/16 |
| 3,883,184 | 4/1959 | Bnewington | 269/296 |
| 4,570,915 | 2/1986 | O'Hern | 269/296 |
| 4,650,379 | 3/1987 | Jaskolski | 409/220 |

Primary Examiner—W. Donald Bray
Attorney, Agent, or Firm—Leon Gilden

[57] ABSTRACT

An apparatus defining right and left side walls, with a top web and a bottom web, each arranged parallel relative to one another and orthogonally directed between the side walls. The side walls include a series of increasing apertures, with apertures of each side wall coaxially aligned relative to one another of a like diameter. A forward edge of the top web includes a gradation gauge for indication of dowel length directed through the aligned apertures. A modification of the invention includes a groove directed through the bottom web, with a slot directed through a right side wall aligned with the groove to receive a saw blade within the groove for storage and lubrication thereof to enhance cutting during use.

8 Claims, 3 Drawing Sheets

DOWELL ROD CUTTING APPARATUS

BACKGROUND OF THE INVENTION

1. Field of the Invention

The field of invention relates to dowel cutting structure, and more particularly pertains to a new and improved dowel rod cutting apparatus wherein the same permits predetermined measuring for severing of desired lengths of dowel rod.

2. Description of the Prior Art

Various structure is provided in the prior art for cooperatively utilizing dowel rods in the securement of such rods for subsequent cutting procedures. The instant invention attempts to overcome deficiencies of such prior art by providing an organization that permits predetermined measuring and subsequent severing of such dowel rod at predetermined lengths. Examples of prior art structure may be found in U.S. Pat. No. 4,752,162 to Groh wherein a jig structure for drilling dowel pin holes is provided, wherein a plurality of spaced "L" shaped framework members are arranged and secured at a predetermined spacing for reception of dowel rod structure therewithin for drilling through such dowel rod members.

U.S. Pat. No. 4,589,806 to Rotta, Jr. sets forth a tap and drill guide wherein a plurality of arms extending outwardly from a center include a cylindrical guide means for directing and guiding taps and drills into a workpiece.

U.S. Pat. No. 4,813,826 to Riedel sets forth a jig structure for surmounting a door member to align the door member for the cutting of proper openings in the door for insulation of mortise locks.

U.S. Pat. No. 4,712,950 to Reynolds sets forth a jig fixture and work holder for receiving and aligning a rod member therewithin for the drilling of various holes.

As such, it may be appreciated that there continues to be a need for a new and improved dowel rod cutting apparatus which addresses both the problems of ease of use as well as effectiveness in construction and in this respect, the present invention substantially fulfills this need.

SUMMARY OF THE INVENTION

In view of the foregoing disadvantages inherent in the known types of dowel rod cutting apparatus now present in the prior art, the present invention provides a dowel rod cutting apparatus wherein the same permits alignment, measuring, and severing of various dowel rod widths into desired lengths. As such, the general purpose of the present invention, which will be described subsequently in greater detail, is to provide a new and omproved dowel rod cutting apparatus which has all the advantages of the prior art dowel rod cutting apparatus and none of the disadvantages.

To attain this, the present invention provides an apparatus defining right and left side walls, with a top web and a bottom web, each arranged parallel relative to one another and orthogonally directed between the side walls. The side walls include a series of increasing apertures, with apertures of each side wall coaxially aligned relative to one another of a like diameter. A forward edge of the top web includes a gradation gauge for indication of dowel length directed through the aligned apertures. A modification of the invention includes a groove directed through the bottom web, with a slot directed through a right side wall aligned with the groove to receive a saw blade within the groove for storage and lubrication thereof to enhance cutting during use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dowel rod cutting apparatus which has all the advantages of the prior art dowel rod cutting apparatus and none of the disadvantages.

It is another object of the present invention to provide a new and improved dowel rod cutting apparatus which may be easily and efficiently manufactured and marketed.

It is a further object of the present invention to provide a new and improved dowel rod cutting apparatus which is of a durable and reliable construction.

An even further object of the present invention is to provide a new improved dowel rod cutting apparatus which is susceptible of a low cost of manufacture with regard to both materials and labor, and which accordingly is then susceptible of low prices of sale to the consuming public, thereby making such dowel rod cutting apparatus economically available to the buying public.

Still yet another object of the present invention is to provide a new and improved dowel rod cutting apparatus which provides in the apparatuses and methods of the prior art some of the advantages thereof, while simultaneously overcoming some of the disadvantages normally associated therewith.

Still another object of the present invention is to provide a new and improved dowel rod cutting apparatus wherein the same permits alignment for subsequent measuring and severing of dowel rods.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
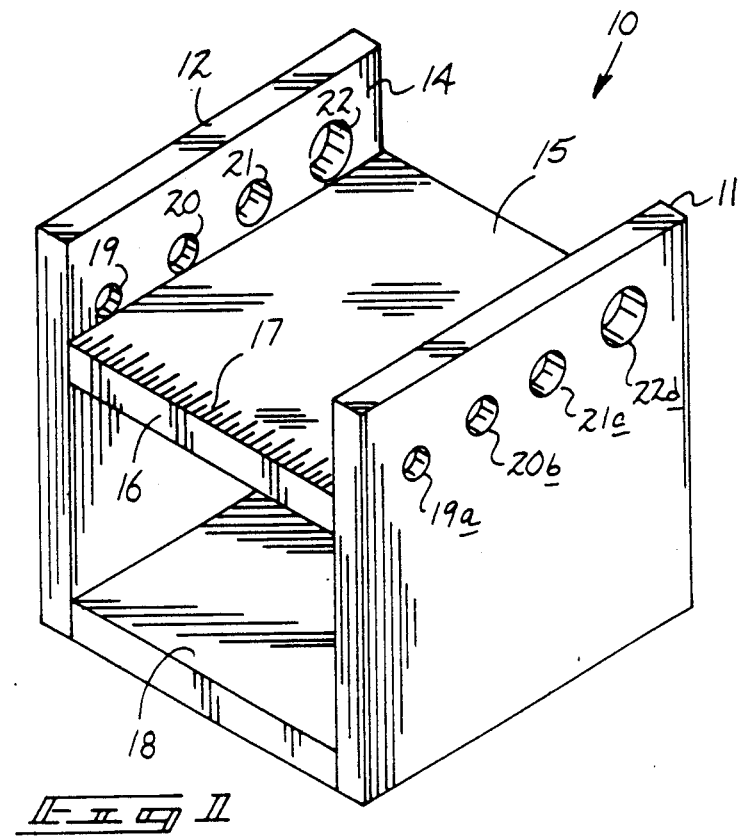
FIG. 1 is an isometric illustration of the instant invention.
Figure 2:
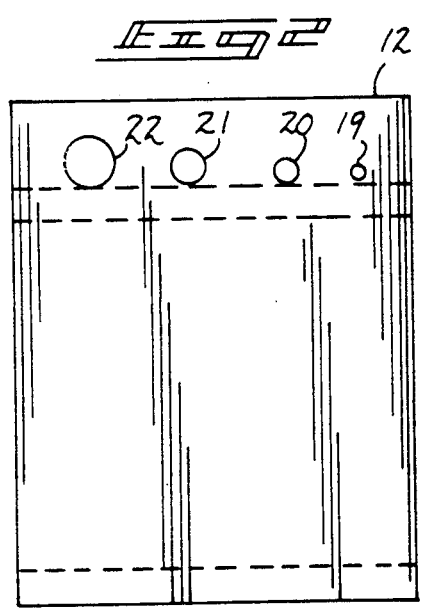
FIG. 2 is an orthographic side view, taken in elevation, of the instant invention.
Figure 3:
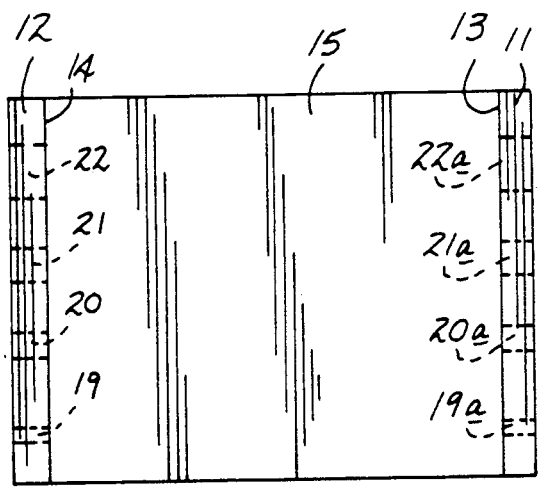
FIG. 3 is an orthographic top view taken in elevation, of the instant invention.

With reference now to the drawings, and in particular to FIG. 1 to 7 thereof, a new and improved dowel rod cutting apparatus embodying the principles and concepts of the present invention and generally designated by the reference numerals 10 and 10a will be described.

More specifically, the dowel rod cutting apparatus 10 of the instant invention essentially comprises a right wall 11 spaced from and parallel to a left wall 12. The right and left walls includes a respective right wall interior surface 13 and a left wall interior surface 14. The right and left interior surfaces 13 and 14 are arranged in spaced parallel planes in confronting relationship relative to one another. An upper web 15 is orthogonally mounted coextensively between the right and left interior surfaces 13 and 14 spaced below top edge surfaces of each of the right and left walls 11 and 12, in a manner as illustrated in FIG. 1 for example. A forward end surface 16 of the upper web 15 includes a graduated scale 17 formed upon a top surface of the upper web 15 adjacent the forward end surface 16. If required, a plurality of such scales may be directed throughout the top surface of the top web 15 or a single scale coextensively directed with the gradation lines arranged parallel to the interior surfaces 13 and 14. A lower web 18 is spaced below and parallel the upper web 15 and orthogonally and integrally mounted between the right and left wall interior surfaces 13 and 14 at lower terminal ends of the right and left walls 11 and 12. The left wall 14 includes a series of left apertures defined by a first, second, third, and fourth left wall apertures 19-22 respectively, with each of the left wall apertures spaced apart relative to one another and tangentially intersecting the top surface of the top web 15 as each of the left wall apertures are directed through the left wall above the top web 15. Similarly, a first, second, third, and fourth right wall aperture 19a, 20a, 21a, and 22a respectfully are directed through the right wall 11, with each of the first through fourth right wall apertures coaxially aligned with a respective first through fourth left wall aperture, with the first apertures of a first diameter, the second apertures of a second diameter, the third apertures of a third diameter, and the fourth apertures of a fourth diameter. The right and left apertures 19 define a first pair, the second apertures define a second pair, the third apertures define a third pair, and the fourth apertures define a fourth pair, with each of the pairs of apertures coaxially aligned relative to one another to receive a dowel rod therethrough to align the dowel rod for predetermined measuring along the graduated scale 17. This permits marking of the dowel rod and subsequent projecting of the dowel rod exteriorly of the left wall 12 for example to permit severing thereof by use of a saw member 24, with the saw member 24 of a type as illustrated in FIG. 4 for example.

Figure 4:
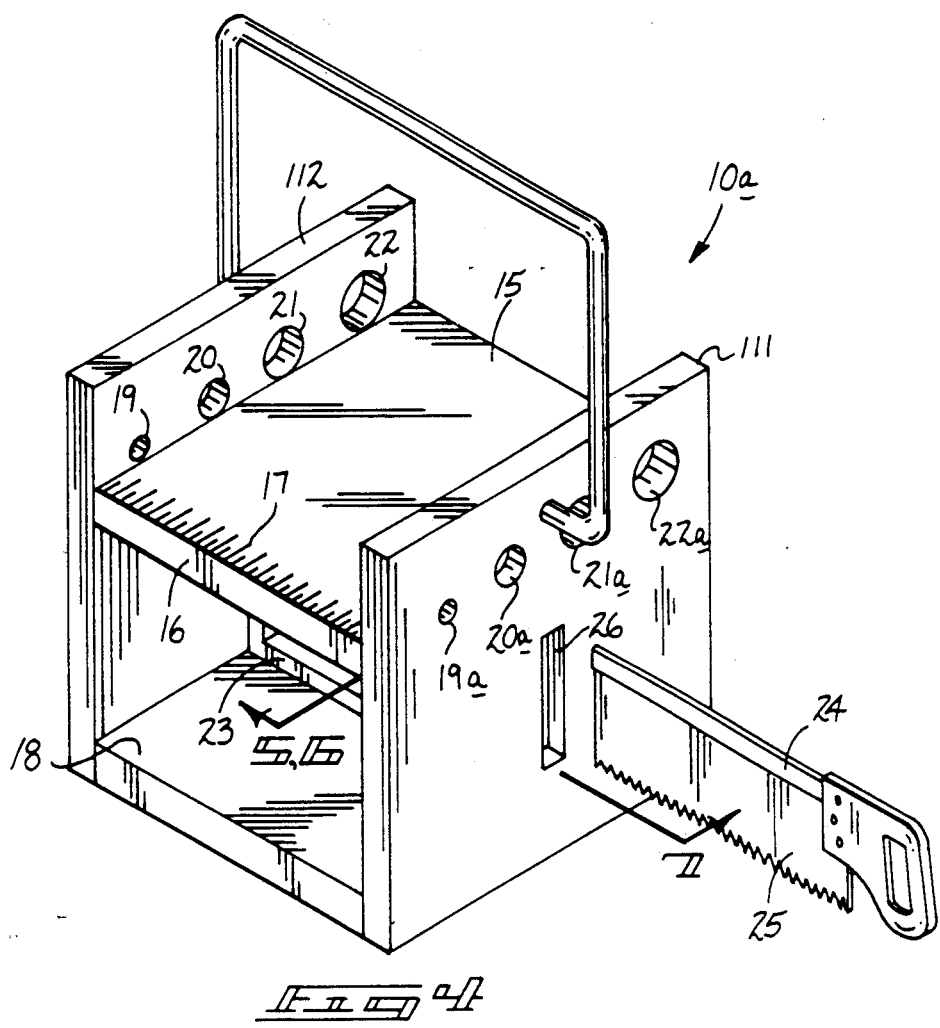
FIG. 4 is an isometric illustration of a modification of the instant invention.
Figure 5:
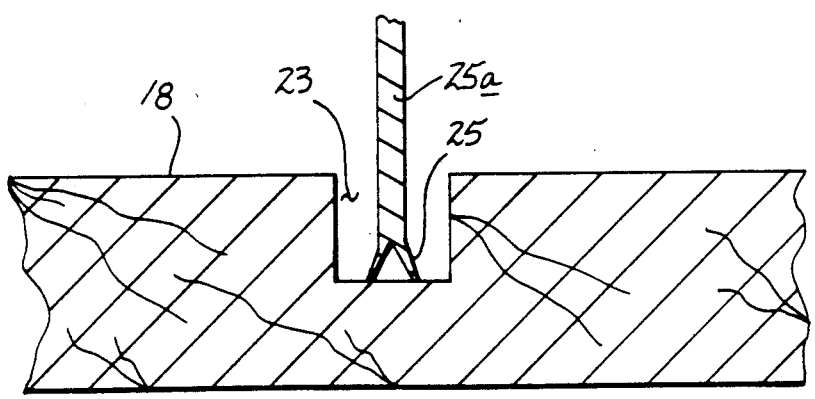
FIG. 5 is an orthographic view, taken along the line 5 of FIG. 4 in the direction indicated by the arrows.

With reference to FIG. 4, the modified apparatus 10a includes a groove 23 directed orthogonally between the right and left walls 111 and 112 and coextensive with the bottom web 18. The groove 23 receives a saw member 24, with the groove 23 defined by a predetermined length and an associated saw blade 25a including a series of saw blade teeth 25 coextensively formed to a bottom edge of the saw blade 25a and is receivable within the groove 23. Accordingly, the saw blade 25a is defined by a saw blade length, wherein the saw blade length is equal to or less than the predetermined length to permit reception of the saw blade teeth 25 within the groove 23 for transport and storage of the saw. It should be further noted that the first slot 26 defined by a predetermined height substantially greater than a saw blade height defined by the saw blade 25a. Further, a "U" shaped handle 27 is mounted medially of and exteriorly the right and left side walls 111 and 112 for transport of the organization.

Figure 6:
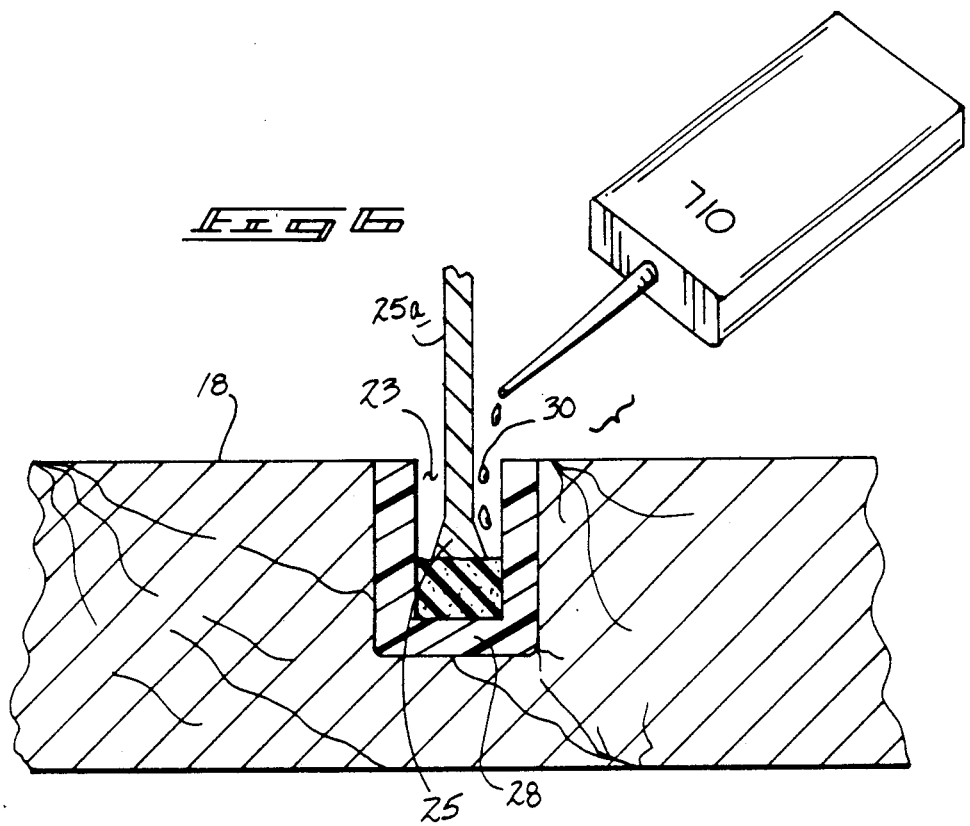
FIG. 6 is an orthographic view, taken along the line 6 of FIG. 4 in the direction indicated by the arrows.
Figure 7:
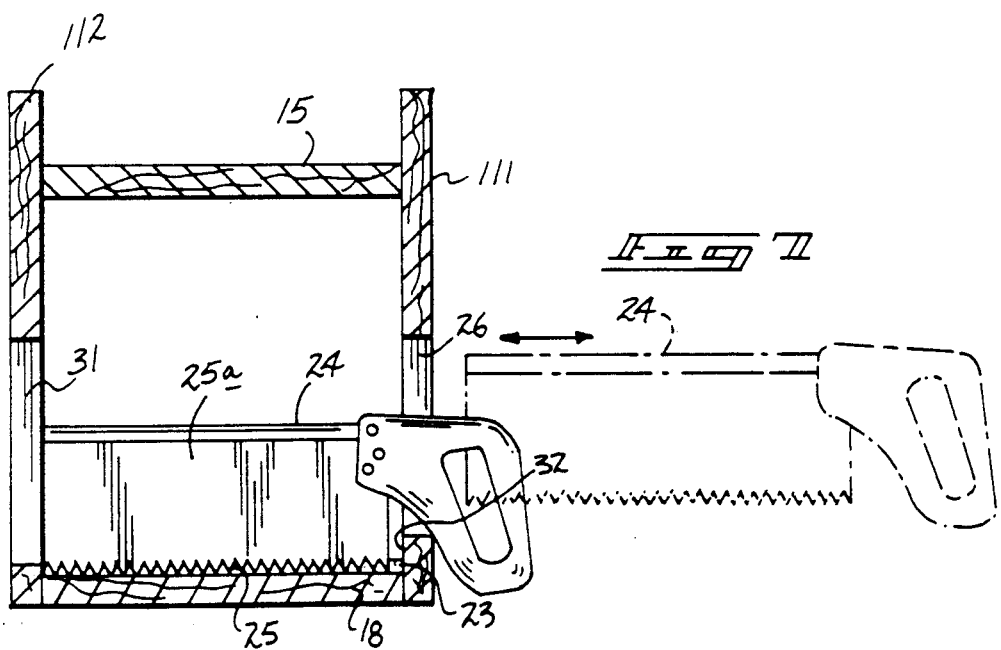
FIG. 7 is an orthographic view, taken in elevation, along line 7 as set forth in FIG. 4.

FIGS. 6 and 7 illustrates the use of a modified slot 23, including an elongated "U" shaped fluid impermeable liner 28 coextensively mounted within the slot 23 and complementarily configured to be received within the side walls and floor of the groove 23. An oil absorbent layer member 29 is coextensively positioned on the floor of the liner 28 to receive the saw blade teeth 25 thereon, with the layer member 29 including a predetermined quantity of lubricating and corrosion resistant oil 30 absorbed within the layer member 29 for coating of the saw blade teeth 25 to enhance their longevity and ease of use of the saw member 24. A second slot 31 aligned with the groove 23 and the first slot 26 may be directed through the left wall 112 to enhance ease of positioning of the saw blade 25 within the groove 23. Further, the first groove 26 includes an abutment surface 32 positioned below the first slot 26 in alignment with the groove 23 to provide an abutment surface to be received between the saw blade 25a and the handle of the saw member 24 to maintain securement of the saw member 24 between the right and left walls 111 and 112.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

What is claimed as being new and desired to be protected by Letters Patent of the United States is as follows:

1. A dowel rod cutting apparatus comprising,
   a right wall spaced from and parallel a left wall, the right wall includes a right wall interior surface, and the left wall includes a left wall interior surface, wherein the right wall interior surface is arranged parallel and spaced from the left wall interior surface and coextensively positioned thereto, and
   an upper web orthogonally and fixedly mounted between the right and left walls spaced below a right wall upper edge and left wall upper edge, and
   a lower web spaced below and parallel the upper web and fixedly and integrally mounted between the right wall interior surface and the left wall interior surface at lower respective terminal ends of the right and left wall, and
   a plurality of left wall apertures including at least a first and second left wall aperture directed through the left wall above the upper web, and
   a plurality of right wall apertures including at least a first and second right wall aperture, wherein the first left wall aperture and the first right wall aperture defines a first pair, and the second left wall aperture and the second right wall aperture define a second pair, wherein the first pair and second pair are coaxially aligned relative to one another said apertures tangentially intersecting a top surface of the upper web to permit support of a dowel rod directed through a selective pair of a pair of apertures.

2. An apparatus as set forth in claim 1 including a graduated scale defined on the top surface of the upper web.

3. An apparatus as set forth in claim 2 wherein the lower web includes a groove directed coextensively of the lower web and orthogonally oriented between the right wall interior surface and left wall interior surface, wherein the groove is defined by a predetermined length, and a saw member, the saw member including a saw blade, wherein the saw blade is defined by a saw blade length, wherein the saw blade length is less or equal to the predetermined length.

4. An apparatus as set forth in claim 3 further including a first slot directed through the right wall aligned with the groove, the slot defined by a predetermined slot height, the saw blade defined by a predetermined saw blade height, wherein the saw blade height is less than or equal to the predetermined slot height.

5. An apparatus as set forth in claim 4 wherein the groove includes an elongate "U" shaped fluid impermeable liner complementarily mounted within the groove.

6. An apparatus as set forth in claim 5 wherein the liner includes an oil absorbent layer member coextensively mounted within the liner to receive the saw blade thereon, the layer member including a predetermined quantity of oil therewithin to impart the oil onto saw blade teeth coextensively formed upon a lower edge of the saw blade.

7. An apparatus as set forth in claim 6 wherein the right wall interior surface defines an abutment surface defined below the first slot and the groove, with the abutment surface aligned with the groove for positioning the abutment surface between the saw blade and a handle of the saw member to secure the saw member within the groove.

8. An apparatus as set forth in claim 7 including a second slot aligned with the first slot and directed through the left wall to enhance ease of positioning of the saw member within the groove.

* * * * *